(12) United States Patent
Shen et al.

(10) Patent No.: US 10,924,304 B2
(45) Date of Patent: Feb. 16, 2021

(54) METHOD AND DEVICE FOR DECODING A SIGNAL, AND MEMORY DEVICE

(71) Applicant: UNIVERSITY OF SCIENCE AND TECHNOLOGY OF CHINA, Anhui (CN)

(72) Inventors: Cong Shen, Anhui (CN); Fei Liang, Anhui (CN); Feng Wu, Anhui (CN)

(73) Assignee: UNIVERSITY OF SCIENCE AND TECHNOLOGY OF CHINA, Anhui (CN)

(*) Notice: Subject to any disclaimer, the term of this patent is extended or adjusted under 35 U.S.C. 154(b) by 306 days.

(21) Appl. No.: 16/062,486

(22) PCT Filed: Aug. 28, 2017

(86) PCT No.: PCT/CN2017/099257
§ 371 (c)(1),
(2) Date: Jun. 14, 2018

(87) PCT Pub. No.: WO2019/041085
PCT Pub. Date: Mar. 7, 2019

(65) Prior Publication Data
US 2019/0288878 A1 Sep. 19, 2019

(51) Int. Cl.
H03D 1/04 (2006.01)
H03D 1/06 (2006.01)
(Continued)

(52) U.S. Cl.
CPC .......... *H04L 25/0254* (2013.01); *G06N 3/04* (2013.01); *G06N 3/08* (2013.01); *H04B 1/06* (2013.01);
(Continued)

(58) Field of Classification Search
CPC ............. H04L 25/0254; H04L 25/0204; H04L 25/03159; G06N 3/04; G06N 3/08; H04B 1/1027; H04B 1/06
(Continued)

(56) References Cited

U.S. PATENT DOCUMENTS 7,532,664 B2   5/2009   Rimini et al.
8,995,920 B2   3/2015   Hirata et al.
(Continued)

FOREIGN PATENT DOCUMENTS

CN   101023594 A   8/2007
CN   101449502 A   6/2009
(Continued)

OTHER PUBLICATIONS

Liang, Fei, et al., "An Iterative BP-CNN Architecture for Channel Decoding," *IEEE Journal of Selected Topics in Signal Processing*, vol. 12, No. 1, pp. 144-159 (Feb. 2018).

*Primary Examiner* — Phuong Phu
(74) *Attorney, Agent, or Firm* — Christensen, Fonder, Dardi & Herbert PLLC

(57) ABSTRACT

A method for decoding a signal. The method comprises decoding a received signal according to a predetermined decoding scheme and obtaining an estimate of a transmission signal based on the decoding result; obtaining an estimate of channel noise by using the correlation of channel noise; generating a modified received signal by subtracting the obtained estimate of channel noise from the received signal; and decoding the modified received signal to obtain a decoded signal according to the predetermined decoding scheme.

9 Claims, 5 Drawing Sheets

(51) Int. Cl.
  *H03K 5/01*   (2006.01)
  *H03K 6/04*   (2006.01)
  *H04B 1/10*   (2006.01)
  *H04L 1/00*   (2006.01)
  *H04L 25/08*  (2006.01)
  *H04L 25/02*  (2006.01)
  *G06N 3/04*   (2006.01)
  *G06N 3/08*   (2006.01)
  *H04B 1/06*   (2006.01)

(52) U.S. Cl.
  CPC ....... *H04B 1/1027* (2013.01); *H04L 25/0204* (2013.01)

(58) Field of Classification Search
  USPC ........ 375/346, 350, 316, 229, 232, 231, 233
  See application file for complete search history.

(56) References Cited

U.S. PATENT DOCUMENTS

| | | | |
|---|---|---|---|
| 2009/0125793 A1 | 5/2009 | Kishigami et al. | |
| 2010/0316151 A1 | 12/2010 | Fukawa et al. | |
| 2011/0255572 A1 | 10/2011 | Giannakis et al. | |
| 2012/0033721 A1* | 2/2012 | Isson | H04L 25/03159 375/227 |

FOREIGN PATENT DOCUMENTS

| CN | 101981846 A | 2/2011 |
|---|---|---|
| CN | 102461037 A | 5/2012 |

* cited by examiner

METHOD AND DEVICE FOR DECODING A SIGNAL, AND MEMORY DEVICE

The present application is a National Phase entry of PCT Application No. PCT/CN2017/099257, filed Aug. 28, 2017, which is incorporated herein by reference in its entirety.

TECHNICAL FIELD

The present application relates to signal decoding, and in particular, to a method for decoding a signal, a device for decoding a signal and a memory device.

BACKGROUND

Since Shannon founded the information theory, significant progresses have been made in the field of channel coding and decoding. With a proper coding design and an efficient belief propagation (BP) algorithm, low-density parity-check (LDPC) codes can achieve near Shannon-limit performance. However, the traditional codec design is mainly for simple channel model, such as Gaussian white noise channel model. However, such codec design does not consider the case of complex channels with noise correlation caused by the existence of factors such as filtering, oversampling, multi-user interference in real channels (such noise is called a colored noise).

Therefore, there is a need for a decoding scheme that can handle such colored noise.

SUMMARY

One aspect of an embodiment of the present disclosure provides a method for decoding a signal. The method comprises decoding a received signal according to a predetermined decoding scheme and obtaining an estimate of a transmission signal based on the decoding result; obtaining an estimate of channel noise by using the correlation of channel noise; generating a modified received signal by subtracting the obtained estimate of channel noise from the received signal; and decoding the modified received signal to obtain a decoded signal according to the predetermined decoding scheme.

Optionally, the obtaining an estimate of channel noise by using the correlation of channel noise comprises: obtaining a first estimate of channel noise by subtracting the estimate of the transmission signal from the received signal; and processing the obtained first estimate of channel noise to obtain a second estimate of channel noise as the estimate of channel noise by using the correlation of channel noise.

Optionally, the processing the obtained first estimate of the channel noise to obtain a second estimate of the channel noise as the estimate of the channel noise by using the correlation of channel noise comprises: taking the first estimate of channel noise as an input to a convolutional neural network and taking an output of the convolutional neural network as the second estimate of the channel noise.

Optionally, the method further comprises training the convolution neural network by using a predetermined strategy, wherein the predetermined strategy includes any one of a training strategy that minimizes residual noise power, and a training strategy that causes distribution of residual noise to approximate to a Gaussian distribution while minimizing residual noise power.

Optionally, the method further comprises iteratively performing operations of decoding the received signal, obtaining an estimate of channel noise based on the correlation of channel noise, and generating the modified received signal by taking the modified received signal as a received signal, until a system state meets predetermined requirement.

Another aspect of an embodiment of the present disclosure provides a device for decoding a signal. The device comprises: a decoder configured to decode a received signal according to a predetermined decoding scheme; a transmission signal estimator configured to obtain an estimate of a transmission signal based on the decoding result; a noise estimator configured to obtain an estimate of channel noise by using the correlation of channel noise; and a modification signal generator configured to generate a modified received signal by subtracting the obtained estimate of channel noise from the received signal. The decoder is further configured to decode the modified received signal to obtain a decoded signal according to the predetermined decoding scheme.

Optionally, the noise estimator comprises: a first noise estimation module configured to obtain a first estimate of channel noise by subtracting the estimate of the transmission signal from the received signal; and a second noise estimation module configured to process the obtained first estimate of the channel noise to obtain a second estimate of the channel noise as the estimate of the channel noise by using the correlation of channel noise.

Optionally, the second noise estimation module is implemented by a convolutional neural network. In such case, the second noise estimation module is further configured to: take the first estimate of channel noise as an input to the convolutional neural network and take an output of the convolutional neural network as the second estimate of the channel noise.

Optionally, the device further comprises a network trainer configured to train the convolution neural network by using a predetermined strategy, wherein the predetermined strategy includes any one of a training strategy that minimizes residual noise power, and a training strategy that causes distribution of residual noise close to Gaussian distribution while minimizing residual noise power.

Optionally, in the device, operations of the decoder, the transmission signal estimator, the noise estimator and the modification signal generator are iteratively performed by taking the modified received signal as a received signal, until a system state meets predetermined requirement.

Still another aspect of an embodiment of the present disclosure provides device for decoding a signal. The device comprises a memory having stored therein executable instructions, and a processor configured to execute the executable instructions stored in the memory to carry out the method described above.

Yet another aspect of an embodiment of the present disclosure provides a storage medium on which a computer program is carried, which computer program, when executed by a processor, causes the processor to carry out the method described above.

BRIEF DESCRIPTION OF THE DRAWINGS

For a more complete understanding of the present invention and its advantages, reference is now made to the following descriptions taken in conjunction with the accompanying drawings, in which.

DETAILED DESCRIPTION

Figure 1:
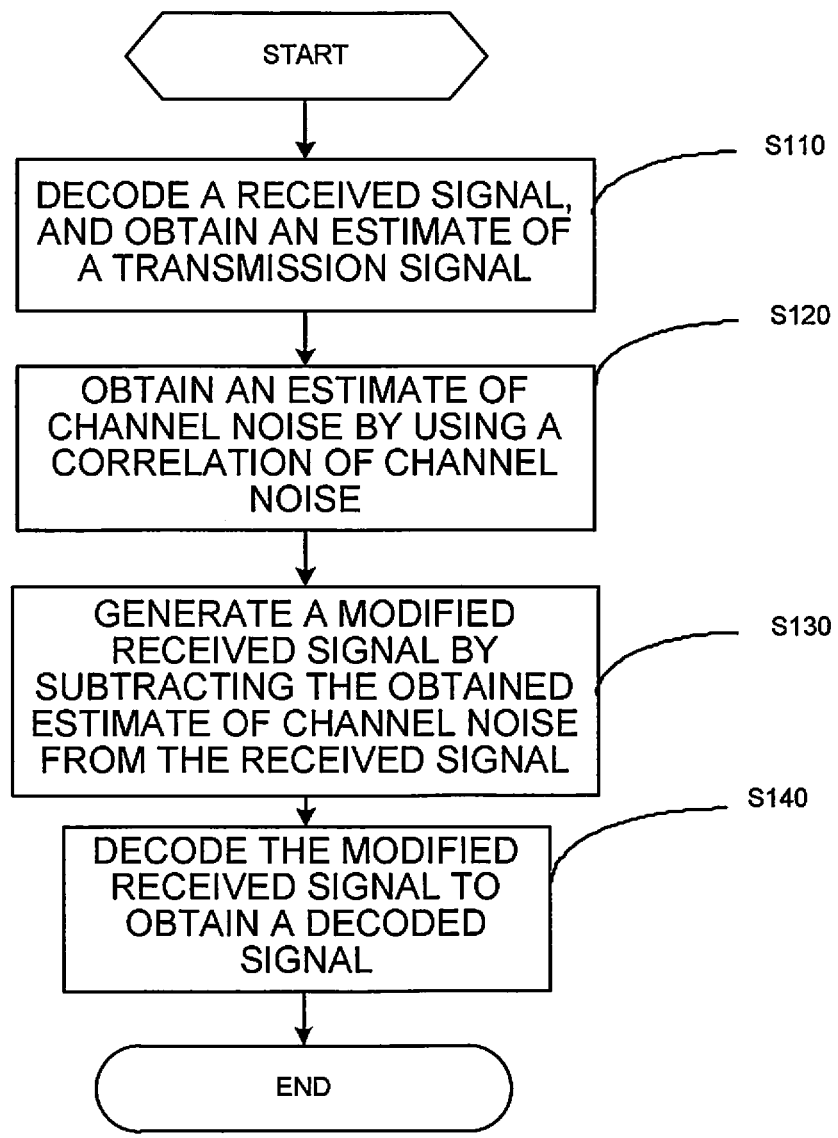
FIG. 1 schematically shows a schematic flow chart of a method for decoding a signal according to an embodiment of the present disclosure.

Hereinafter, embodiments of the present disclosure will be described with reference to the accompanying drawings. It should be understood, however, that the descriptions are illustrative only and not intended to limit the scope of the disclosure. In addition, in the following description, descriptions of well-known structures and techniques are omitted to avoid unnecessarily obscuring the concepts of the present disclosure.

The terminology used herein is used to describe particular embodiments only, and is not intended to limit the disclosure. The terms "a", "an" and "the" and the like, as used herein, should also include the meaning of "a plurality," "a variety of" unless the context clearly dictates otherwise. Furthermore, the terms "include," "include," and the like as used herein indicate the presence of stated features, steps, operations, and/or components but do not preclude the presence or addition of one or more other features, steps, operations, or components.

All terms (including technical and scientific terms) used herein have the meaning as commonly understood by one skilled in the art, unless otherwise defined. It should be noted that terms used herein should be interpreted as having a meaning that is consistent with the context of the present description and should not be interpreted in an idealized or overly stereotypical manner.

Some block diagrams and/or flow charts are shown in the drawings. It should be understood that some of the blocks in the block diagrams and/or flowchart illustrations, or combinations thereof, may be implemented by computer program instructions. These computer program instructions may be provided to a processor of a general purpose computer, specific purpose computer, or other programmable data processing apparatus such that the instructions, when executed by the processor, create means for implementing functions/operations illustrated in these block diagrams and/or flowcharts.

Accordingly, the techniques of the present disclosure may be implemented in the form of hardware and/or software (including firmware, microcode, etc.). In addition, the techniques of the present disclosure may take the form of a computer program product on a computer readable medium having stored thereon instructions for use by or in connection with an instruction execution system. In the context of the present disclosure, a computer readable medium may be any medium that can contain, store, communicate, propagate, or transport the instructions. For example, computer readable media can include but are not limited to electrical, magnetic, optical, electromagnetic, infrared, or semiconductor systems, devices, devices, or propagation media. Specific examples of the computer readable medium may include a magnetic storage device such as a magnetic tape or a hard disk (HDD), an optical storage device such as a compact disc (CD-ROM), a memory such as a random access memory (RAM) or a flash memory, and/Wireless communication link.

FIG. 1 schematically shows a schematic flow chart of a method for decoding a signal according to an embodiment of the present disclosure.

As shown in FIG. 1, the method includes operation S110 of decoding a received signal according to a predetermined decoding scheme, and obtaining an estimate of a transmission signal based on a decoding result.

The predetermined decoding scheme mentioned herein may be any decoding scheme applicable, for example, a belief propagation (BP) scheme. Of course, depending on a specific application, it may also be any decoding scheme corresponding to a coding scheme used at the transmitting side.

In some examples, obtaining the estimation of the transmission signal based on the decoding result may comprise re-encoding the decoding result according to a coding scheme corresponding to the used decoding scheme, and taking the coded signal obtained by re-encoding as an estimation of the transmission signal. Of course, any other technique available in the art for estimating the transmission signal at the receiving side may also be applicable here, and the embodiment of the present disclosure is not limited to the specific implementation of estimating a transmission signal.

In operation S120, an estimate of channel noise is obtained by using the correlation of channel noise.

In embodiments of the present disclosure, the correlation of noise in the channel caused by such factors as filtering, oversampling, multi-user interference and the like can be taken into account to more accurately estimate noise in the real channel.

In some examples, obtaining the estimate of channel noise by using the correlation of channel noise may comprise obtaining a first estimate of channel noise by subtracting the estimate of the transmission signal from the received signal; and processing the obtained first estimate of channel noise to obtain a second estimate of channel noise as the estimate of channel noise described in operation S120 by using the correlation of channel noise.

In some examples, a convolutional neural network (CNN) may be used to utilize the correlation of channel noise. In this case, the first estimate of channel noise is used as input to the convolutional neural network, and an output of the convolution neural network is used as the second estimate of channel noise.

Prior to using the convolutional neural network to obtain the second estimate of channel noise, the convolution neural network can be trained by using a predetermined strategy. In some examples, the predetermined strategy may include a training strategy that minimizes residual noise power, such as a Baseline BP-CNN (Baseline BP-CNN) strategy. In other examples, the predetermined strategy may also include a training strategy that causes distribution of residual noise to approximate to a Gaussian distribution while minimizing residual noise power, for example, an Enhanced BP-CNN (Enhanced BP-CNN) strategy. Of course, strategies that can be used to train the convolutional neural network in the embodiments of the present disclosure are not limited to the above two, but may include any other strategy that enables the trained convolutional neural network to estimate the channel noise more accurately.

After obtaining the estimate of channel noise by using the correlation of channel noise in operation S120, the obtained estimate of channel noise is subtracted from the received signal to generate a modified received signal in operation S130.

Since a good estimate of channel noise is obtained by using the correlation of channel noise in operation S120, the modified received signal obtained may better approximate to the transmission signal to be transmitted at the transmitting side by subtracting the good estimate from the received signal.

In some cases, performing operation S120 only once may not be able to obtain a good estimate of the actual channel noise (e.g., colored noise). In this case, operations of decoding the received signal (S110), obtaining an estimate of channel noise based on the correlation of channel noise (S120), and generating the modified received signal (S130) may be iteratively performed by taking the modified received signal as a received signal, until the system state meets the predetermined requirements. The predetermined requirement mentioned here may be that the number of system iterations reaches a preset number of times or that the decoded signal no longer changes or may be any other requirement for noise estimation commonly used by one skilled in the art.

Then, in operation S140, the modified received signal is decoded according to the same predetermined decoding scheme as in operation S110 to obtain a decoded signal.

In the method shown in FIG. 1, by obtaining a good estimate of channel noise by using the correlation of channel noise and subtracting the good estimate from the received signal, an estimation of a transmission signal can be obtained more accurately, which in turn achieves a high-quality decoding.

Figure 2:
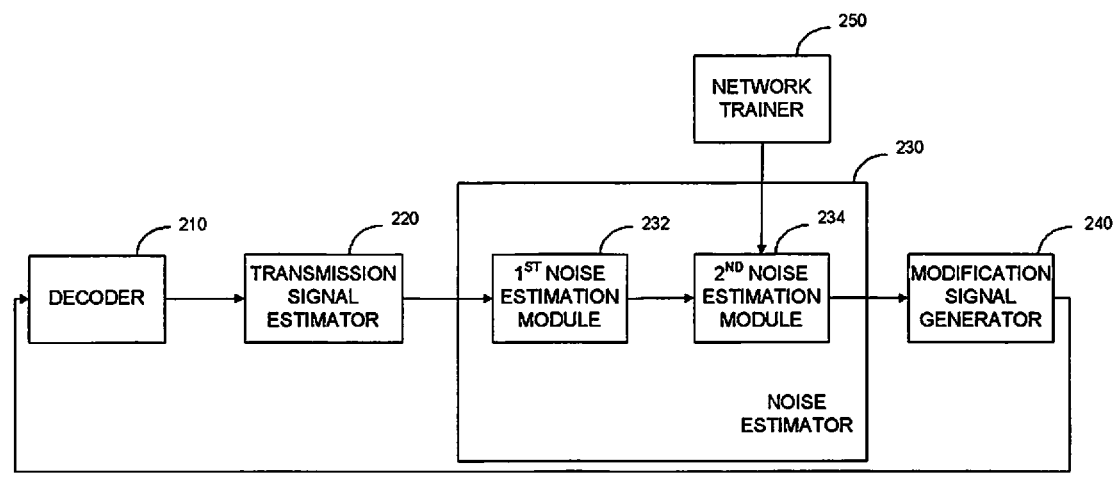
FIG. 2 schematically shows a schematic block diagram of a device for decoding a signal according to an embodiment of the present disclosure.

FIG. 2 schematically shows a schematic block diagram of a device for decoding a signal according to an embodiment of the present disclosure. The block diagram shown in FIG. 2 corresponds to the flow chart shown in FIG. 1. It should be noted that for clarity and conciseness, the block diagram shown in FIG. 2 only shows the functions/modules that are helpful for understanding the embodiments of the present disclosure. In a specific implementation, more or fewer functions/modules may also be included.

As shown in FIG. 2, the device comprises a decoder 210, a transmission signal estimator 220, a noise estimator 230 and a modification signal generator 240.

The decoder 210 is configured to decode a received signal according to a predetermined decoding scheme.

The predetermined decoding scheme mentioned herein may be any decoding scheme applicable, for example, a belief propagation (BP) scheme. Of course, depending on a specific application, it may also be any decoding scheme corresponding to a coding scheme used at the transmitting side.

The transmission signal estimator 220 is configured to obtain an estimate of a transmission signal based on the decoding result.

In some examples, obtaining the estimation of the transmission signal based on the decoding result may comprise re-encoding the decoding result according to a coding scheme corresponding to the used decoding scheme, and taking the coded signal obtained by re-encoding as an estimation of the transmission signal. In this case, the transmission signal estimator may be an encoder that utilizes a coding scheme corresponding to a used decoding scheme, for example, an encoder same as that one at the transmitting side. Of course, any other technique available in the art for estimating the transmission signal at the receiving side may also be applicable here, and the embodiment of the present disclosure is not limited to the specific implementation of estimating a transmission signal.

The noise estimator 230 is configured to obtain an estimate of channel noise by using the correlation of channel noise.

In embodiments of the present disclosure, the correlation of noise in the channel caused by such factors as filtering, oversampling, multi-user interference and the like can be taken into account to more accurately estimate noise in the real channel.

In some examples, the noise estimator 230 may comprise a first noise estimation module 232 and a second noise estimation module 234. The first noise estimation module 232 may be an adder/subtractor configured to obtaining a first estimate of channel noise by subtracting the estimate of the transmission signal from the received signal. The second noise estimation module 234 may be configured to process the obtained first estimate of channel noise to obtain a second estimate of channel noise as the estimate of channel noise by using the correlation of channel noise.

In some examples, a convolutional neural network (CNN) may be used to utilize the correlation of channel noise. That is, the second noise estimation module 234 is implemented by a convolutional neural network. In this case, the first estimate of channel noise is used as input to the convolutional neural network, and an output of the convolution neural network is used as the second estimate of channel noise.

In some examples, prior to using the convolutional neural network to obtain the second estimate of channel noise, the convolution neural network can be trained by using a predetermined strategy to enable the convolutional neural network. In this case, the device shown in FIG. 2 may further comprise a network trainer 250 configured to train the convolution neural network by using a predetermined strategy. In some examples, the predetermined strategy may include a training strategy that minimizes residual noise power, such as a Baseline BP-CNN (Baseline BP-CNN) strategy. In other examples, the predetermined strategy may also include a training strategy that causes distribution of residual noise to approximate to a Gaussian distribution while minimizing residual noise power, for example, an Enhanced BP-CNN (Enhanced BP-CNN) strategy. Of course, strategies that can be used to train the convolutional neural network in the embodiments of the present disclosure are not limited to the above two, but may include any other strategy that enables the trained convolutional neural network to estimate the channel noise more accurately.

Since a good estimate of channel noise is obtained by the noise estimator 230 by using the correlation of channel noise, the modified received signal obtained may better approximate to the transmission signal to be transmitted at the transmitting side by subtracting the good estimate from the received signal.

After obtaining the estimate of channel noise by using the correlation of channel noise, the noise estimator 230 generates a modified received signal by subtracting the obtained estimate of channel noise from the received signal.

In some cases, one-time operation of the noise estimator 230 may not be able to obtain a good estimate of the actual channel noise (e.g., colored noise). In this case, operations of the decoder, the transmission signal estimator, the noise estimator and the modification signal generator may be iteratively performed by taking the modified received signal as a received signal, until the system state meets the predetermined requirements. The predetermined requirement mentioned here may be that the number of system iterations reaches a preset number of times or that the decoded signal no longer changes or may be any other requirement for noise estimation commonly used by one skilled in the art.

After generating a modified received signal, the decoder 210 is further configured to decode the modified received signal to obtain a decoded signal according to the predetermined decoding scheme.

In the device shown in FIG. 2, by obtaining a good estimate of channel noise by using the correlation of channel noise and subtracting the good estimate from the received signal, an estimation of a transmission signal can be obtained more accurately, which in turn achieves a high-quality decoding.

The technical solutions of the embodiments of the present disclosure are described above by the method shown in FIG. 1 and the device shown in FIG. 2. A technical solution according to the embodiments of the present disclosure will be described in detail below with a specific example. It should be noted that, the technical solution of the embodiments of the present disclosure is not limited to this specific example, but may further include various modifications made to the example within the protection scope of the present disclosure.

Figure 3:
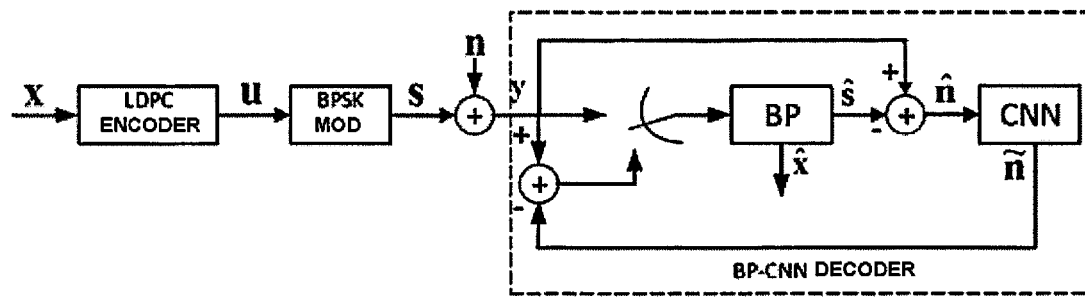
FIG. 3 shows a schematic diagram of a decoding scheme according to an embodiment of the present disclosure.

FIG. 3 shows a schematic diagram of a decoding scheme according to an embodiment of the present disclosure. It should be noted that FIG. 3 is only a specific example for illustrating the embodiments of the present disclosure and should not be considered as a limitation on the embodiments of the present disclosure. For example, FIG. 3 uses an LDPC coding and BPSK modulation scheme at the transmitting side and a BP decoding scheme at the receiving side. However, those skilled in the art can understand that the technical solution in the embodiments of the present disclosure may also be applied to different codec and modulation.

In the technical scheme of FIG. 3, it is assumed that a codeword u is obtained at the transmitting side by a block of information bits x passing through an LDPC encoder, and a symbol s is then obtained by performing BPSK modulation on the codeword. After the symbol s passes through a colored noise channel, the receiving side receives a noisy signal y=s+n, where n represents the colored noise. The receiving side decodes the transmission signal through an iterative structure consisting mainly of a BP decoder and a convolutional neural network (CNN). An iterative process consists mainly of two steps. In the first step, the noisy signal y passes through a standard BP decoder, and an estimate of the transmission signal s can be obtained according to the decoding result, denoted as $\hat{s}$. This estimate is subtracted from the noisy signal received at the receiving side to obtain an estimate of the channel noise, i.e., $\hat{n}=y-\hat{s}$. There may be an error between $\hat{n}$ and the actual channel noise due to a possible BP decoding error. The noise estimate can therefore be written as $\hat{n}=n+\xi$, $\xi$ representing the noise estimation error due to a BP decoding error. In the second step, $\hat{n}$ is inputted to a deep convolutional neural network (CNN). CNN will use the correlation of channel noise to estimate the noise again and obtain a more accurate estimate of the noise, denoted as $\tilde{n}$. $\tilde{n}$ will be subtracted from the received signal y, to obtain $\hat{y}=y-\tilde{n}=s+n-\tilde{n}=s+r$, where $r=n-\tilde{n}$ is defined as the residual noise. If CNN makes a more accurate estimation on channel noise, the residual noise has a lower power and $\hat{y}$ has a higher signal-to-noise ratio than y. Therefore, $\hat{y}$ will be inputted into the BP decoder again and the BP decoder will get a more accurate decoding result. The above process can be iteratively performed to gradually compress the residual noise and to improve decoding performance.

In the example of FIG. 3, the beginning and the end of the above iterative process are shown by a single-pole double-throw switch. For example, when the noisy signal y is decoded by the standard BP decoder in the first step described above, the switch may be switched to connect the BP decoder and the noisy signal y. After the modified received signal is generated, the switch connects the BP decoder and the modified received signal by taking the modified received signal as a received signal. The BP decoder, CNN and the adder form a loop. When the system state meets the predetermined requirement (e.g., the number of system iterations reaches a preset number of times or the decoded signal no longer changes), the loop may be turned off. The control signals for the switch can be generated by any means used at the time or in the future in the art and the scope of protection of the present invention is not limited by the way in which the control signals are generated. In addition, the beginning and the end of the iterative loop in the embodiments of the present disclosure are not limited to the form of the single-pole double-throw switch shown in FIG. 3, and any specific implementation manners for cycling operations in the art may be used.

Figure 4:
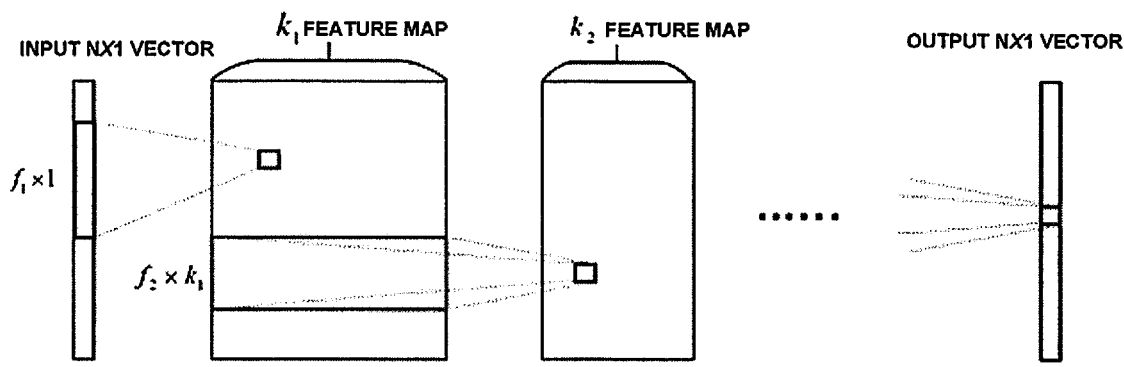
FIG. 4 shows a schematic diagram of a CNN structure used according to an embodiment of the present disclosure.

FIG. 4 shows a schematic diagram of a CNN structure used according to an embodiment of the present disclosure. In the structure shown in FIG. 4, a vector N×1, that is, noise estimation $\hat{n}$, is input. In the first layer, $k_1$ feature maps are obtained by a convolution operation, denoted mathematically as $c_{1,j}=\text{ReLU}(h_{1,j}*\hat{n}+b_{1,j})$, in which $c_{1,j}$ represents the jth feature map in the first layer, $h_{1,j}$ is a one-dimensional convolution kernel of length $f_1$, * denotes the convolution operation, $b_{1,j}$ denotes an offset corresponding to the jth feature map, and ReLU (Rectified Linear Unit function) represents an activation function (i.e., max(x,0)). At the ith level, the convolution operation is performed on all the feature maps of the upper layer, so it can be taken as a two-dimensional convolution, denoted mathematically as $c_{i,j}=\text{ReLU}(h_{i,j}*c_{i-1}+b_{i,j})$. $c_{i,j}$ represents the jth feature map of the ith layer, $h_{i,j}$ is the jth convolution kernel of the ith layer, with a size of $f_i \times k_{i-1}$, $f_i$ and $k_{i-1}$ represent respectively the size of the convolution kernel of the ith layer and the number of the feature maps of the i−1th layer, $c_{i-1}$ represents a two-dimensional matrix formed by arranging all the feature maps of the i−1th layer. Using L to denote the number of layers in the network, at the last layer, layer L, the final output of the network is $\tilde{n}=h_L*c_{L-1}+b_L$, a noise estimate that is more accurate than the noise estimate $\hat{n}$. The network structure shown in FIG. 4 can be simplified as $\{L; f_1, f_2, \ldots, f_L; k_1, k_2, \ldots, k_L\}$.

As mentioned above, the CNN network is trained prior to using the CNN network for noise estimation. Network training can include two steps. First, training data needs to be generated for a particular channel. In this step, the source bits x can be randomly generated, the channel noise can be collected in the actual channel, or a channel model can be trained in advance. In practice, it is usually necessary to train for some common communication scenarios (models), and the trained network model can be stored at the receiving side, which selects a corresponding channel model for a specific communication scenario. In actual use, an appropriate model can be selected based on the channel estimation. In the case of presence of channel noise data, the input data $\hat{n}$ of CNN can be obtained according to the flow shown in FIG. 3. The training for CNN can be done only one time, and the same network model is always used during the iteration. Of course, in some cases, multiple trainings may be done as well.

In order to train the network, it needs to define a loss function. The following embodiments of the present disclosure give two methods for defining a loss function, which respectively correspond to different network training strategies. It should be noted that the following loss function definitions and/or network training strategies are merely examples provided to illustrate aspects of the embodiments of the present disclosure and that other loss function definitions and/or network training strategies used in the art may also be applicable in the embodiment of the present disclosure.

Network Training Strategy 1: Baseline BP-CNN, which minimizes residual noise power. The loss function can be defined as:

$$Loss_A = \frac{\|r\|^2}{N},$$

where r represents the residual noise vector, and N represents the length of the vector.

In this training strategy, the empirical distribution of residual noise is calculated after the training is completed, and the distribution is used to initialize the log-likelihood ratios (LLRs) of variable nodes of the next BP decoding.

Network Training Strategy 2: Enhanced BP-CNN (Enhanced BP-CNN). This strategy adjusts the distribution of residual noise so that it is close to a Gaussian distribution while compressing the residual noise power. Since most encoders are designed for Gaussian channels, this strategy can be better adapted to the encoder. The loss function is defined as $$Loss_B = \frac{\|r\|^2}{N} + \lambda\left(S^2 + \frac{1}{4}(C-3)^2\right),$$

wherein $r_i$ is the ith element of the residual noise vector r, and $\bar{r}$ is the mean of $r_i$. $\lambda$ is a weight factor that is used to adjust weights of the two parts. In this case, the calculation of the empirical distribution of residual noise is not required, and only the variance needs to be calculated and the initial value of LLR of the variable nodes of the next BP decoding needs to be calculated according to the Gaussian distribution.

Figure 5:
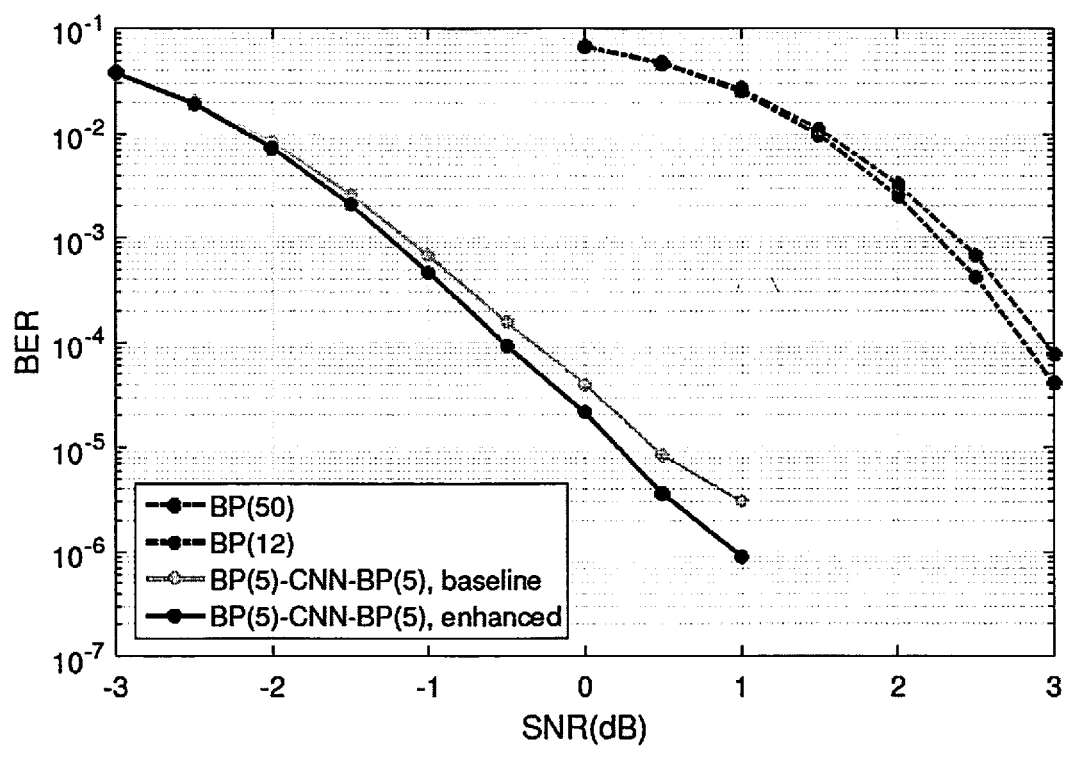
FIGS. 5 to 8 respectively show performance comparisons for two different channel correlation models.
Figure 6:
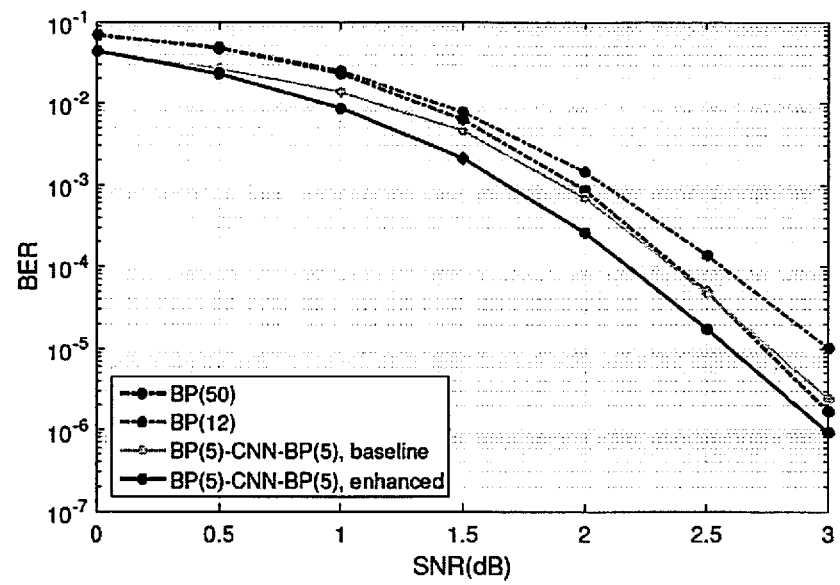
Figure 7:
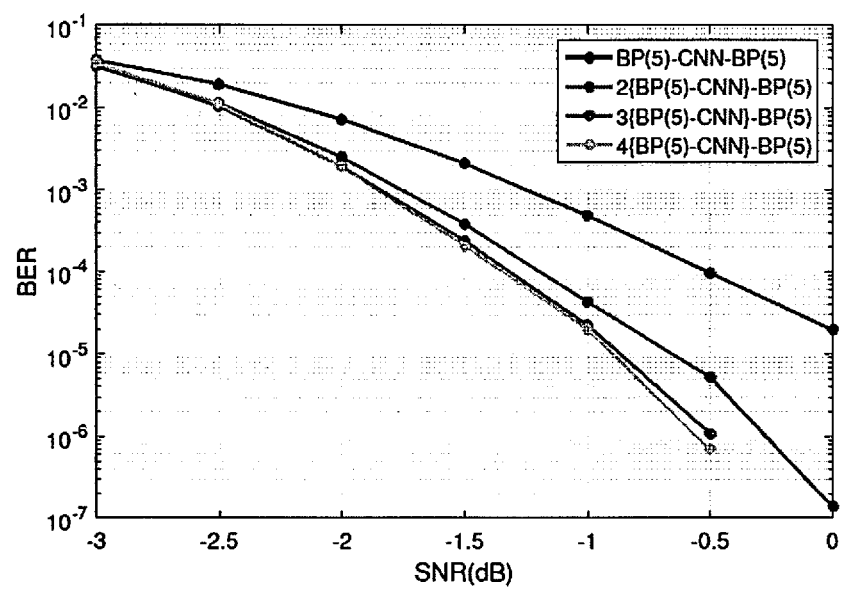
Figure 8:
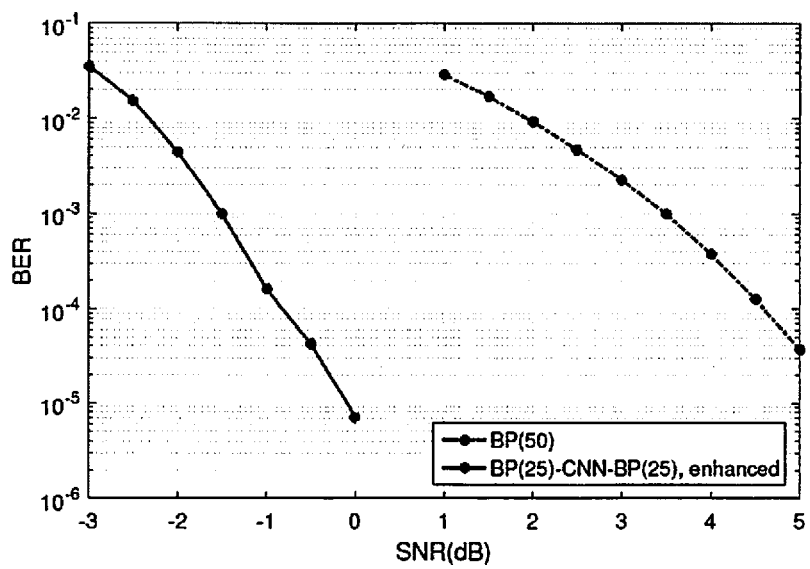

In order to further illustrate the effect of the technical solutions of the embodiments of the present disclosure, FIG. 5 to FIG. 8 respectively show the performance comparisons for the two different channel correlation models. FIG. 5 to FIG. 6 show schematic diagrams of performance comparison with different degrees of correlation for the first type of channel correlation model, and FIG. 7 shows a schematic diagram of the relationship between the performance and the number of iterations for the first type of channel correlation model, and FIG. 8 shows a schematic diagram of the performance comparison for the second channel correlation model.

The first channel correlation model:
Elements in the correlation matrix R of the model are defined as $R_{i,j}=\eta^{|i-j|}$. The LDPC code rate is 3/4, the code length is 576, and the code matrix comes from WiMax standard. It should be noted that the foregoing parameters are merely examples, and the application of the technical solutions of the embodiments of the present disclosure does not depend on a specific coding rate and a coding matrix. With the above parameters, the adopted CNN network structure can be {4; 9,3,3,15; 64,32,16,1}. The test results coming out from only one BP-CNN iteration with parameter η=0.8 (strong correlation) and parameter η=0.5 (moderate correlation), which represents the correlation, are given in FIGS. 5 and 6, respectively. The decoding structure at the time can be simplified as BP (x) -CNN-BP (x), where the numbers in parentheses indicate the number of iterations of the BP decoder. The structural complexity of BP (5) -CNN-BP (5) given in FIG. 5 and FIG. 6 is roughly equivalent to 12 standard BP iterations. It can be seen from the results in the figure that whether using the baseline BP-CNN training strategy or the enhanced BP-CNN training strategy, the technical solutions of the embodiments of the present disclosure can achieve better results than the standard BP algorithm. At the same time, increasing the number of iterations of a standard BP will further improve performance, but the improvement is very limited. This shows that the technical solutions of the embodiments of the present disclosure can achieve higher performance with lower complexity, FIG. 7 shows the result of multiple BP-CNN iterations. It can be seen from the figure that multiple BP-CNN iterations can further improve the decoding performance.

The Second Channel Correlation Model:
The correlation of this channel correlation model can be expressed by using power spectral density, i.e., $P(f) \propto 1/|f|^\alpha$. In particular, if α=1, the noise is called pink noise. FIG. 8 shows the performance comparison between the technical solution of the embodiments of the present disclosure and the standard BP decoder when the remaining conditions are the same as the first channel correlation model. It can be seen from FIG. 8 that the technical solution in the embodiments of the present disclosure also can achieve better decoding performance under such channel model.

Figure 9:
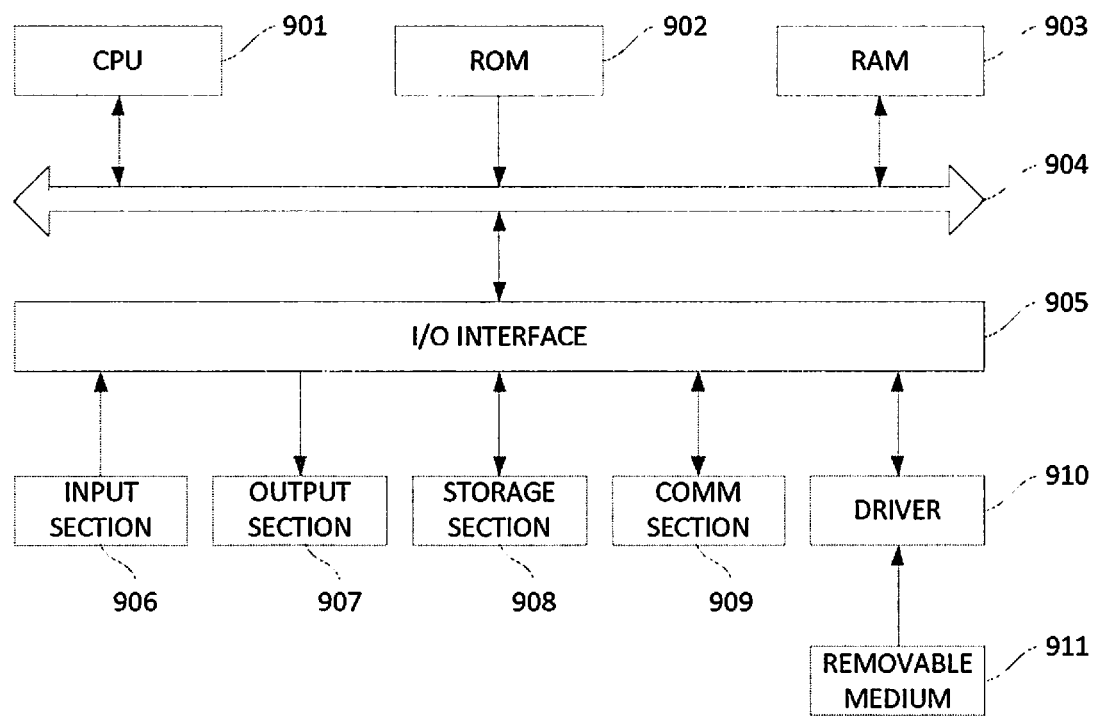
FIG. 9 schematically shows a schematic block diagram of an electronic device according to an embodiment of the present disclosure.

FIG. 9 schematically shows a block diagram of an apparatus according to an embodiment of the present disclosure. The apparatus shown in FIG. 9 is only an example, and should not limit the function and the scope of use of the embodiments of the present disclosure.

As shown in FIG. 9, the apparatus 900 according to the embodiment includes a central processing unit (CPU) 901 that performs a variety of appropriate actions and processes according to a program stored in a read only memory (ROM) 902 or loaded from a storage section 908 into a random access memory (RAM) 903. In the RAM 903, various programs and data necessary for the operation of the device 900 are also stored. The CPU 901, the ROM 902, and the RAM 903 are connected to each other by a bus 904. An input/output (I/O) interface 905 is also connected to the bus 904.

The device 900 may further comprise one or more of the following components connected to the I/O interface 905: an input section 906 including a keyboard or a mouse or the like; an output section 907 including a display such as a cathode ray tube (CRT) or a liquid crystal display (LCD) etc., a storage section 908 including a hard disk or the like, and a communication section 909 including a network interface card such as a LAN card or a modem. The communication section 909 performs communication processing via a network such as the Internet. The drive 910 is also connected to the I/O interface 905 as needed. A removable medium 911, such as a magnetic disk, an optical disk, a magneto-optical disk or a semiconductor memory, etc., is mounted on the drive 910 as needed so that a computer program read out therefrom is installed into the storage section 908 as needed.

In particular, according to an embodiment of the present disclosure, the process described above with reference to the flowcharts may be implemented as a computer software program. For example, an embodiment of the present disclosure includes a computer program product comprising a computer-readable medium, on which a computer program is carried, which computer program contains program code for carrying out the method shown in the flowchart. In such an embodiment, the computer program may be downloaded and installed from the network through the communication section 909, and/or installed from the removable medium 911. When the computer program is executed by the central processing unit (CPU) 901, the above-described functions defined in the apparatus of the embodiments of the present disclosure are performed.

It should be noted that, the computer readable medium shown in the present disclosure may be a computer readable signal medium or a computer readable storage medium, or any combination thereof. The computer-readable storage medium may be, for example, but are not limited to, an electrical, magnetic, optical, electromagnetic, infrared, or semiconductor system, apparatus, or device, or any combination of the above. More specific examples of computer readable storage medium may include, but are not limited to, an electrical connection having one or more wires, a portable computer disk, a hard disk, a random access memory (RAM), a read only memory (ROM), an erasable Programmable Read Only Memory (EPROM or Flash), optical fiber, portable Compact Disk Read Only Memory (CD-ROM), optical storage, magnetic storage, or any suitable combination of the above. In the present disclosure, a computer readable storage medium may be any tangible medium that can contain or store a program for use by or in connection with an instruction execution system, apparatus, or device. In the present disclosure, the computer-readable signal medium may include data signals propagating in the baseband or as part of a carrier carrying computer-readable program code. Such propagated data signals may take many forms, including but not limited to electromagnetic signals, optical signals, or any suitable combination of the above. The computer-readable signal medium may also be any computer-readable medium other than a computer-readable storage medium that can send, propagate, or transport a program for use by or in connection with an instruction execution system, apparatus, or device. The program code embodied on the computer readable medium may be transmitted using any appropriate medium, including but not limited to wireless, wired, optical fiber cable or RF, etc., or any suitable combination of the above.

The flowcharts and block diagrams in the figures illustrate the architecture, functionality, and operation of possible implementations of systems, methods, and computer program products in accordance with various embodiments of the present disclosure. In this regard, each block of the flowcharts or block diagrams can represent a module, a section of a program, or a portion of a program code that includes one or more executable instructions that implement the specified logic functions. It should also be noted that in some alternative implementations, the functions indicated in the blocks may occur in an order different from the order shown in the figures. For example, two blocks shown in succession may in fact be executed substantially in parallel, and sometimes they may be executed in the reverse order, depending on the function involved. It should also be noted that each block of the block diagrams or flowcharts and combinations of blocks in the block diagrams or flowcharts may be implemented by special purposed hardware-based systems that perform the specified functions or operations, or may be implemented by a combination of dedicated hardware and computer instructions.

The methods, devices, units and/or modules according to various embodiments of the present disclosure may also use, for example, a Field Programmable Gate Array (FPGA), a Programmable Logic Array (PLA), a system on a chip, a system on a substrate, Application Specific Integrated Circuit (ASIC) or hardware or firmware that integrate or package a circuit in any suitable way, or an appropriate combination of hardware, software and firmware. The system may include a storage device to implement the storage described above. When implemented in these ways, the software, hardware and/or firmware used are programmed or designed to perform the corresponding methods, steps and/or functions according to the present disclosure. The skilled in the art may appropriately implement one or more of these systems and modules, or some or more of the components by using different above implementations, according to actual requirements. All of these implementations fall into the protection scope of the present invention.

As will be understood by the skilled in the art, for any and all purposes, such as providing written description, all ranges disclosed in the present application also cover any and all possible sub-ranges, as well as sub-ranges thereof. Any listed range can be easily recognized as sufficiently describing and enabling the same range being broken down, at least, into two equal parts, three parts, four parts, five parts, ten parts and so on. As a non-limiting example, each of the ranges discussed in this application can be easily broken down into the lower third, the middle third, the upper third, and so on. As will also be understood by the skilled in the art, all languages such as "up to," "at least," "greater than," "less than," etc., include the stated quantities and refer to the same as the range of sub-ranges. Finally, as will be understood by the skilled in the art, the range includes the individual components. Therefore, for example, a group having 1-3 units refers to a group having 1, 2, or 3 units. Similarly, a group having 1-5 units refers to a group having 1, 2, 3, 4 or 5 units, and the like.

Although the present invention has been shown and described with reference to certain exemplary embodiments thereof, it will be understood by the skilled in the art that various changes in form and details to the disclosure may be made therein without departing from the spirit and scope of the invention, as defined by the appended claims and their equivalents. Therefore, the scope of the invention should not be limited to the above-described embodiments, but should be determined not only by the appended claims but also by equivalents of the appended claims.

We claim:

1. A method for decoding a signal, comprising:
   decoding a received signal according to a predetermined decoding scheme and obtaining an estimate of a transmission signal based on the decoding result;
   obtaining an estimate of channel noise by using the correlation of channel noise;
   generating a modified received signal by subtracting the obtained estimate of channel noise from the received signal; and
   decoding the modified received signal to obtain a decoded signal according to the predetermined decoding scheme
   wherein the obtaining an estimate of channel noise by using the correlation of channel noise comprises:
   obtaining a first estimate of channel noise by subtracting the estimate of the transmission signal from the received signal; and
   processing the obtained first estimate of channel noise to obtain a second estimate of channel noise as the estimate of channel noise by using the correlation of channel noise.

2. The method of claim 1, wherein the processing the obtained first estimate of the channel noise to obtain a second estimate of the channel noise as the estimate of the channel noise by using the correlation of channel noise comprises:
  taking the first estimate of channel noise as an input to a convolutional neural network and taking an output of the convolutional neural network as the second estimate of the channel noise.

3. The method of claim 2, further comprising:
  training the convolution neural network by using a predetermined strategy, wherein the predetermined strategy includes any one of a training strategy that minimizes residual noise power, and a training strategy that causes distribution of residual noise to approximate to a Gaussian distribution while minimizing residual noise power.

4. The method of claim 1, further comprising:
  iteratively performing operations of decoding the received signal, obtaining an estimate of channel noise based on the correlation of channel noise, and generating the modified received signal by taking the modified received signal as a received signal, until a system state meets predetermined requirement.

5. A device for decoding a signal, comprising:
  a decoder configured to decode a received signal according to a predetermined decoding scheme;
  a transmission signal estimator configured to obtain an estimate of a transmission signal based on the decoding result;
  a noise estimator configured to obtain an estimate of channel noise by using the correlation of channel noise; and
  a modification signal generator configured to generate a modified received signal by subtracting the obtained estimate of channel noise from the received signal;
  wherein the decoder is further configured to decode the modified received signal to obtain a decoded signal according to the predetermined decoding scheme,
  wherein the noise estimator comprises:
    a first noise estimation module configured to obtain a first estimate of channel noise by subtracting the estimate of the transmission signal from the received signal; and
    a second noise estimation module configured to process the obtained first estimate of the channel noise to obtain a second estimate of the channel noise as the estimate of the channel noise by using the correlation of channel noise.

6. The device of claim 5, wherein the second noise estimation module is implemented by a convolutional neural network, and wherein the second noise estimation module is further configured to:
  take the first estimate of channel noise as an input to the convolutional neural network and take an output of the convolutional neural network as the second estimate of the channel noise.

7. The device of claim 6, further comprising:
  a network trainer configured to train the convolution neural network by using a predetermined strategy, wherein the predetermined strategy includes any one of a training strategy that minimizes residual noise power, and a training strategy that causes distribution of residual noise close to Gaussian distribution while minimizing residual noise power.

8. The device of claim 5, wherein operations of the decoder, the transmission signal estimator, the noise estimator and the modification signal generator are iteratively performed by taking the modified received signal as a received signal, until a system state meets predetermined requirement.

9. A non-volatile, non-transitory storage medium on which a computer program is stored, which computer program, when executed by a processor, causes the processor to carry out the method according to claim 1.

* * * * *